United States Patent [19]

Dequasie et al.

[11] 4,449,163
[45] May 15, 1984

[54] AC CAPACITOR AND IMPREGNANT THEREFOR

[75] Inventors: Andrew E. Dequasie, Pownal, Vt.; Sidney D. Ross, Williamstown, Mass.

[73] Assignee: Sprague Electric Company, North Adams, Mass.

[21] Appl. No.: 470,420

[22] Filed: Feb. 28, 1983

[51] Int. Cl.³ .............................................. H01G 4/22
[52] U.S. Cl. ..................................... 361/315; 252/573; 252/576; 361/318; 361/319; 361/323; 361/327
[58] Field of Search ................ 252/573, 576; 361/315, 361/318, 319, 323, 327

[56] References Cited

U.S. PATENT DOCUMENTS

| | | | |
|---|---|---|---|
| 2,437,501 | 3/1948 | Burkhard et al. | 252/573 |
| 2,899,614 | 8/1959 | Petley | 252/573 |
| 4,317,159 | 2/1982 | Dequasie | 361/318 |

Primary Examiner—John E. Kittle
Assistant Examiner—Robert A. Wax

[57] ABSTRACT

An AC metallized film capacitor having a plurality of electrodes separated by a dielectric spacer contains a dielectric fluid and 2 to 10% of α-naphthyl isocyanate as impregnant system to scavenge moisture and to improve capacitance retention.

6 Claims, 1 Drawing Figure

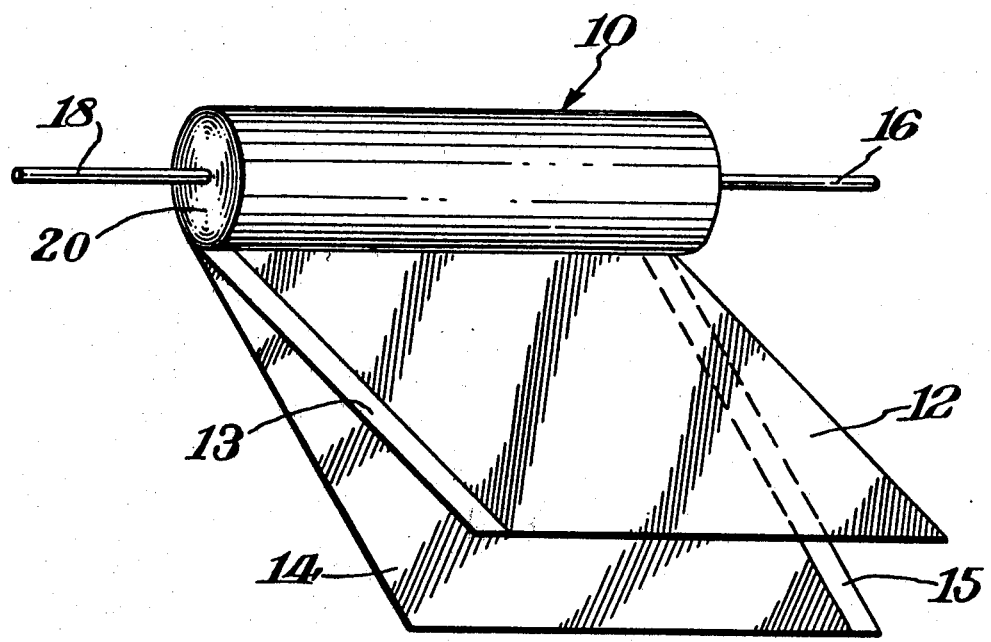

AC CAPACITOR AND IMPREGNANT THEREFOR

BACKGROUND OF THE INVENTION

This invention relates to an AC capacitor containing a dielectric fluid and 2 to 10% α-naphthyl isocyanate as additive to improve the capacitance retention and hence life characteristics of the capacitor. Virtually all dielectric fluids will dissolve trace amounts of water, and the silicone dielectric fluids are no exception. In the case of the silicone fluids, however, traces of water have a much more severe and adverse impact than that found with hydrocarbon or ester dielectric fluids. The insulation resistance is greatly reduced and the electrical properties are vitiated.

Water pickup during impregnation can be avoided by controlling the plant atmosphere and drying the oil. However, since AC film capacitor cases and seals are not truly hermetic, trace amounts of water and somewhat larger amounts of air containing oxygen will enter the capacitor and hence the fluid, impairing and degrading it.

Under voltage, aluminum metallization can react with water vapor or oxygen, converting the aluminum to the oxide, an insulator, with a resultant extensive capacity loss. By a mechanism which is not now fully understood the dielectric system of the present invention is effective in preventing this capacity loss. This effect may result either from the material functioning as a water scavenger or as an oxygen inhibitor.

SUMMARY OF THE INVENTION

An AC metallized film capacitor is impregnated with a dielectric fluid containing α-naphthyl isocyanate to scavenge water and to improve capacitance retention.

A variety of antioxidants, inhibitors, and other additives including diisocyanates were tried but were not soluble in silicone fluids. It was, therefore, a surprise when the α-naphthyl isocyanate was sufficiently soluble to improve capacitance retention.

Preferably, 2 to 10% of the additive is incorporated in the fluid. Lesser amounts do not afford sufficient protection, and greater amounts begin to change the properties of the dielectric as well as being expensive. Generally, 5 wt% is sufficient.

BRIEF DESCRIPTION OF THE DRAWING

The sole FIGURE depicts a partly unwound capacitor section in which the improved dielectric composition of the present invention is used as the impregnant.

DESCRIPTION OF THE PREFERRED EMBODIMENTS

Capacitance retention and hence life characteristics of AC metallized film capacitors have been found to be improved through the use of a dielectric fluid containing α-naphthyl isocyanate. A metallized film section 10, such as is shown partly unrolled in the FIGURE, consists of two metallized-film electrodes 12 and 14, e.g., aluminized polypropylene. The electrodes 12 and 14 are provided with unmetallized margins 13 and 15, respectively, which are oppositely positioned in the winding 10 so that the metallized portion of each electrode is available for lead contact at only one edge of the winding. The ends of the wound section 10 are covered with metallic spray or solder 20, and tabs or leads 16 and 18 are connected thereby to electrodes 12 and 14, respectively. The section 10 is impregnated with the dielectric composition of the present invention, preferably by vacuum impregnation methods known to the capacitor art.

The usefulness of the α-naphthyl isocyanate additive to improve capacitance retention in both ester-based and silicone dielectric fluids was demonstrated in life tests at 500 V, 80° C., and 60 Hz for a total of 4964 hrs for the control and ester plus additive and 3049 hrs for the silicone plus additive. Three sets of capacitors containing an ester fluid, diisononylphthalate, were used as control and had initial capacitance values of 9.901, 9.945, and 9.936 µF respectively. Two sets of capacitors contained in the same ester fluid plus 5 wt% α-naphthyl isocyanate and had initial capacitance values of 9.930 and 9.922 µF respectively. Another three sets of capacitors were impregnated with dimethyl siloxane fluid plus 5 wt% α-naphthyl isocyanate and had initial capacitance values of 9.952, 9.919, and 9.888 µF respectively.

There was little change in capacitance, percent power factor, or equivalent series resistance in any group for the first 500 hrs. However, the control group had lost 5.84% capacitance by 1000 hrs compared with 1.68% for the ester plus additive and 1.30% for the silicone plus additive. Percent power factor remained relatively unchanged over the duration of the test for all groups, and equivalent series resistance increased by 2.5 ohms for the control, 2.2 ohms for the ester plus additive, and 1.1 ohms for the silicone plus additive.

Capacitance change increased dramatically for the control group every 1000 hrs of life test after the first 1000 hrs to a final value of 24.9% loss at 4964 hrs. The ester plus additive group lost only 2% capacitance in this time, and the silicone plus additive group lost slightly less, 1.6% at 3049 hrs. Thus, both additive groups lost only at most one-tenth of that lost by the control group.

The additive thereby improved capacitance retention, and hence life characteristics, without adverse effect on other electrical properties, specifically percent power factor and equivalent series resistance.

Other dielectric film materials, such as ultra-high molecular weight polyethylene, polypropylene-polybutene blends, may be used, but polypropylene is preferred.

What is claimed is:

1. An AC metallized film capacitor comprising a contiguously wound metallized film impregnated with a silicone dielectric fluid containing 2 to 10% of α-naphthyl isocyanate to improve capacitance retention.

2. A capacitor according to claim 1 wherein 5 wt% α-naphthyl isocyanate is present.

3. A capacitor according to claim 1 wherein said dielectric fluid is dimethyl siloxane.

4. A capacitor according to claim 1 wherein said metallization is aluminum.

5. A capacitor according to claim 4 wherein said film is polypropylene.

6. A capacitor according to claim 1 wherein two metallized films are present.

* * * * *